United States Patent [19]

Ellis

[11] Patent Number: 5,163,973
[45] Date of Patent: Nov. 17, 1992

[54] PROCESS FOR PRODUCING LOW SODA ALUMINA

[75] Inventor: Charles D. Ellis, Dollard, Canada

[73] Assignee: Alcan Internatinal Limited, Montreal, Canada

[21] Appl. No.: 798,210

[22] Filed: Nov. 26, 1991

Related U.S. Application Data

[63] Continuation-in-part of Ser. No. 665,340, Mar. 6, 1991, Pat. No. 5,158,577, which is a continuation-in-part of Ser. No. 480,059, Feb. 14, 1990, Pat. No. 5,102,426.

[51] Int. Cl.⁵ .............................................. B01D 9/02
[52] U.S. Cl. .................................. 23/301; 23/305 A; 423/121; 423/127; 423/625; 423/629
[58] Field of Search ................... 23/301, 305; 423/629, 423/121, 122, 123, 124, 127, 625

[56] References Cited

U.S. PATENT DOCUMENTS

| | | | |
|---|---|---|---|
| 2,707,669 | 5/1955 | Houston et al. | 423/124 |
| 3,486,850 | 12/1969 | Day | 423/127 |
| 3,649,184 | 3/1972 | Featherson | 423/629 |
| 4,234,559 | 11/1980 | Tschamper | 423/629 |
| 4,305,913 | 12/1981 | Anjier | 423/123 |
| 4,311,486 | 1/1982 | Yamada et al. | 423/629 |
| 4,364,919 | 12/1982 | Yamada et al. | 423/629 |
| 4,512,959 | 4/1985 | Pohland et al. | 423/121 |
| 4,614,642 | 9/1986 | Cristol et al. | 423/121 |
| 4,617,179 | 10/1986 | Veyrier | 423/121 |

FOREIGN PATENT DOCUMENTS

| | | | |
|---|---|---|---|
| 3219288 | 6/1983 | Fed. Rep. of Germany | 423/629 |
| 49-4696 | 1/1974 | Japan | 423/629 |
| 55-51720 | 4/1980 | Japan | 423/629 |

OTHER PUBLICATIONS

Brown, N. "The Production of Coarse Mosaie Aluminum Trihydroxide from Ball-Milled Seed," *Light Metals* 1990 (C. Bechert, ed.), pp. 131-139.

Primary Examiner—Michael Lewis
Assistant Examiner—Ngoc-Yen M. Nguyen
Attorney, Agent, or Firm—Cooper & Dunham

[57] ABSTRACT

In a process for precipitating alumina hydrate from a stream of Bayer process liquor, wherein the stream is first divided into a major portion and a minor portion, the minor portion fed to an agglomeration stage and seeded with fine seed to induce precipitation and formation of a slurry, and the major portion cooled and charged with coarse seed and directed to a growth stage to induce formation of alumina hydrate product, the steps of: separating solids from the minor portion after formation of the slurry; cooling, to a temperature of between about 45° C. and about 60° C., the liquid remaining after separating solids from the slurry formed in the agglomeration stage; adding an amount of coarse seed to the remaining liquid to generate a slurry of fresh hydrate nuclei; and recombining the slurry of fresh hydrate nuclei with the major portion of the stream.

15 Claims, 4 Drawing Sheets

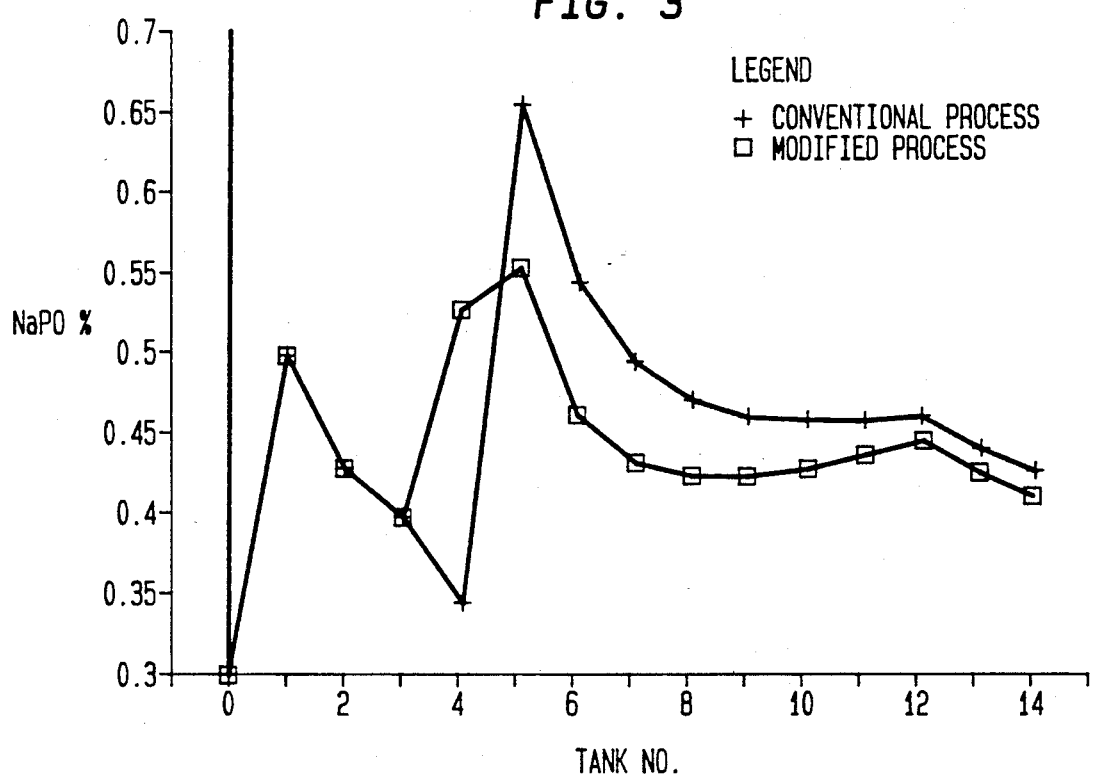
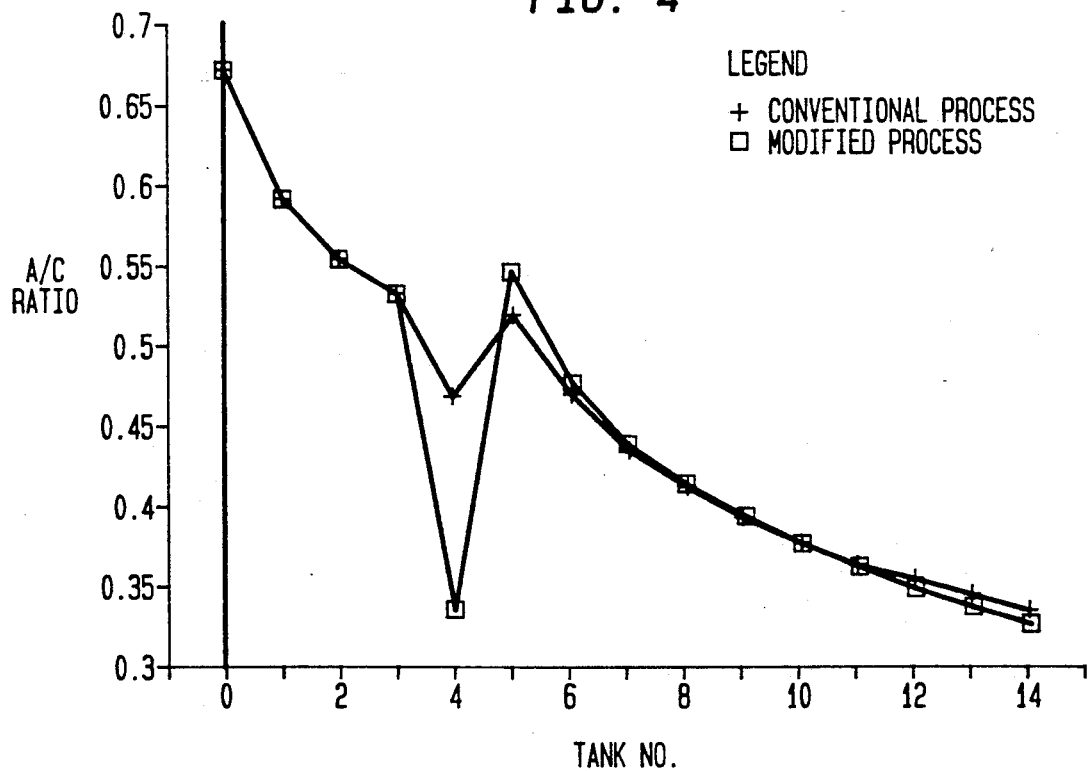

PROCESS FOR PRODUCING LOW SODA ALUMINA

RELATED APPLICATIONS

This application is a continuation-in-part of U.S. patent application Ser. No. 665,430, filed Mar. 6, 1991, now U.S. Pat. No. 5,158,577 which is in turn a continuation-in-part of Ser. No. 480,059, filed Feb. 14, 1990, now U.S. Pat. No. 5,102,426. The entire contents of these parent applications are incorporated by reference with the same force and effect as if fully set forth herein.

FIELD OF THE INVENTION

The present invention relates to improved processes for precipitating alumina hydrate from pregnant Bayer process liquor, and more particularly to a process for reducing the sodium content of alumina trihydrate produced by the Bayer process.

BACKGROUND OF THE INVENTION

Constant efforts have been made to improve the Bayer process in the more than hundred years since its invention. Some of those efforts have focused on attempts to increase the yield, particle size, and particle strength of the alumina recovered from Bayer process liquors. These attempts have included modifying various aspects of the process including dividing the incoming pregnant liquor stream into more than one part and feeding one part to a series of tanks known as the agglomeration section, while directing the remainder of the stream to a second series of tanks known as the growth section. For example, U.S. Pat. No. 4,311,486 (Yamada) proposes dividing the incoming flow into two portions, and adding from 30-150 grams/liter of seed having a particle size of less than 10 microns to the agglomeration section. The patent also proposes adding from 30-150 grams/liter of coarse seed to the growth section.

U.S Pat. No. 4,614,642 (Cristol) also divides the incoming pregnant liquor stream into two parts. According to that patent, 700 grams/liter of seed should be added to the agglomeration stage, and no seed should be added to the growth stage of the process.

In the parent applications, other improvements in the Bayer process have also been disclosed. While a more complete understanding of these improvements and inventions may be obtained by reviewing those applications, briefly, the inventions described therein involve: (1) dividing the incoming Bayer process pregnant liquor stream into a major portion and a minor portion and adding to the minor portion a first particle size of seed to induce precipitation of alumina; and (2) passing the minor portion containing the first seed fraction through an agglomeration stage. The particles precipitated in the agglomeration stage are carried from the first circuit and reunited with the major portion of the stream. A second larger particle size seed is added to induce precipitation of alumina in the recombined stream in the growth stage.

While the processes and precipitation systems disclosed in the above-identified parent applications represent major improvements in the Bayer process, in most instances it may be desirable to obtain alumina particles with even lower soda content than result from the practice of the processes disclosed in the parent applications.

As those of ordinary skill in the art know, an important objective in any design of a Bayer process improvement includes an attempt to obtain alumina product with as low sodium content as possible. Generally speaking, a trade-off exists between the soda content alumina and the rate of production. Thus, a balance must be struck among the various parameters and conditions involved in the precipitation of alumina according to the Bayer process, in order to maximize production of alumina with as low a soda content as possible.

SUMMARY OF THE INVENTION

It is therefore a principal object of the invention to lower the soda (expressed as $Na_2O$) of the alumina product. To this and other ends, the invention broadly contemplates the provision of improvements in a process for precipitating alumina hydrate from a stream of Bayer process liquor, wherein the stream is first divided into a major portion and a minor portion, the minor portion is fed to an agglomeration stage and seeded with fine seed which has a median particle size of about 30 to about 60 microns to induce precipitation and formation of a slurry. The major portion is cooled and charged with coarse seed of about 80 to about 100 microns in median particle size and directed to a growth stage to induce formation of alumina hydrate product. The solids are separated from the minor portion after formation of the slurry and liquid remaining after separating solids is cooled to a temperature of between 45° C. and about 60° C. A small amount of coarse seed of about 80 to about 100 microns in median particle size is added to the remaining liquid to generate fresh hydrate nuclei, and the fresh hydrate nuclei is recombined with the major portion of the stream.

In another aspect, the invention also involves an apparatus for enhancing the precipitation of low soda Bayer process hydrate in a Bayer process reactor system which divides an incoming Bayer process pregnant liquor stream into a major portion fed to a growth stage and a minor portion fed to an agglomeration stage. The apparatus comprises means for feeding a slurry formed in the agglomeration phase to a separation unit for removing solids from the slurry, a separation unit for removing substantially all solids from the slurry, means for feeding solids separated from the slurry to the growth stage, means for cooling remaining liquid to a temperature of between about 45° C. to about 60° C., means for feeding a coarse seed charge to the remaining liquid after cooling, a plurality of nucleation tanks for precipitating alumina hydrate from the remaining liquid, and means for feeding the alumina hydrate precipitated from the remaining liquid to the Bayer process reactor system.

Further features and advantages of the invention will become evident upon consideration of the following detailed description in conjunction with the attached drawings.

BRIEF DESCRIPTION OF THE DRAWINGS

FIG. 3 is a plot of the $Na_2O$ concentration in the precipitated alumina in each of the various vessels or tanks shown in FIG. 2.

FIG. 4 is a plot of alumina to caustic ratio for each of the tanks shown in FIG. 2.

DETAILED DESCRIPTION OF THE PREFERRED EMBODIMENT

Figure 1A:
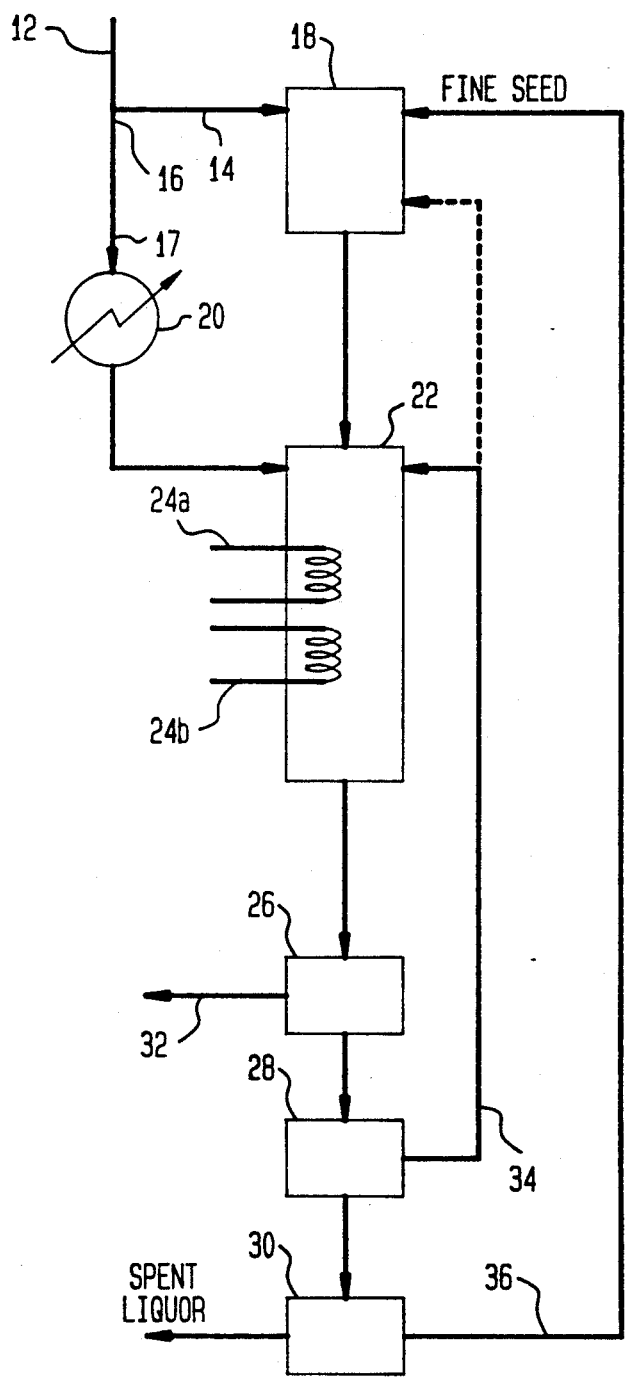
FIG. 1A is a schematic drawing of a Bayer process circuit flowsheet for use in the present invention.

The basic principles of the Bayer process for removing alumina from bauxite ore have not changed in the more than 100 years which have elapsed since the original patent was granted. The Bayer process takes advantage of the reaction of the trihydrate and/or monohydrate of alumina contained in bauxite ore with aqueous caustic soda to form sodium aluminate. In a typical example of the Bayer process the following operations are performed in turn: (1) dissolution of the alumina at a high temperature in the presence of caustic soda; (2) separation and washing of insoluble impurities of bauxite (red muds) to recover the soluble alumina and caustic soda; (3) partial hydrolysis of sodium aluminate at a lower temperature to precipitate aluminum trihydroxide; (4) regeneration of the solutions for reuse by evaporation of the water introduced by the washing; and (5) calcination of the aluminum trihydroxide to anhydrous alumina.

The digestion of bauxite with sodium hydroxide aims to dissolve as much as possible of the alumina, either as the monohydrate (boehmite) or trihydrate (gibbsite) in the shortest possible time and to produce a solution from which a maximum amount of alumina can be precipitated per unit volume. Digestions are usually performed in steel autoclaves or in tubular reactors. Heat exchangers recover much of the heat content of liquor leaving the reactor to heat liquor entering it.

The insoluble residues remaining after digestion are commonly known as red mud. They include iron oxides, sodium aluminum silicate, titanium oxide and other metal oxide impurities. The red muds may have a very fine particle size, making them difficult to separate and wash. These operations are usually accomplished by continuous countercurrent decantation with the dilute wash liquors being combined with the more concentrated pregnant liquors. After decantation, the pregnant liquors are normally submitted to a polishing filtration.

Once filtration is complete and the last traces of insoluble mud have been removed, the filtered liquors are cooled in preparation for precipitating their alumina content. To induce precipitation, aluminate liquor is seeded with seed obtained from previously precipitated crystals, and the mixture is agitated. The seed grows to an acceptable size and is then separated from the liquor.

European and American plants employ slightly different variations of the Bayer process. European plants use much higher caustic concentrations for digestion of bauxite ore. This more concentrated liquor requires less energy per unit volume of liquor circulated. In the American process, use of a more dilute caustic solution results in production of larger particles, although at a somewhat lower yield. In either case, plant operators seek to maximize yield and maintain soda content of the alumina product as low as possible.

The Bayer process as practiced in Europe and the United States has evolved over the years to satisfy the demands made by the continuous and ongoing development of the process. These demands now include:

1. High yield from the process liquor, to minimize the energy requirements of the process, and to maximize the production rate from existing facilities. In practice this implies precipitation from a caustic solution having a caustic concentration higher than previously considered normal for North American Bayer circuits—typically 150-200 gpl NaOH caustic expressed as $Na_2CO_3$— now 200-300 gpl.

2. Production of a coarse granular product, to minimize dusting and facilitate handling in subsequent phases of metal production—typically less than 10% -44 micron.

3. Production of a material with a low total soda content, to match the low losses from modern dry-scrubbed long-life cells in the smelters, and to avoid excess bath generation. Typically, values of less than 0.40% $Na_2O$ (on a calcined basis) are now required.

Figure 1B:
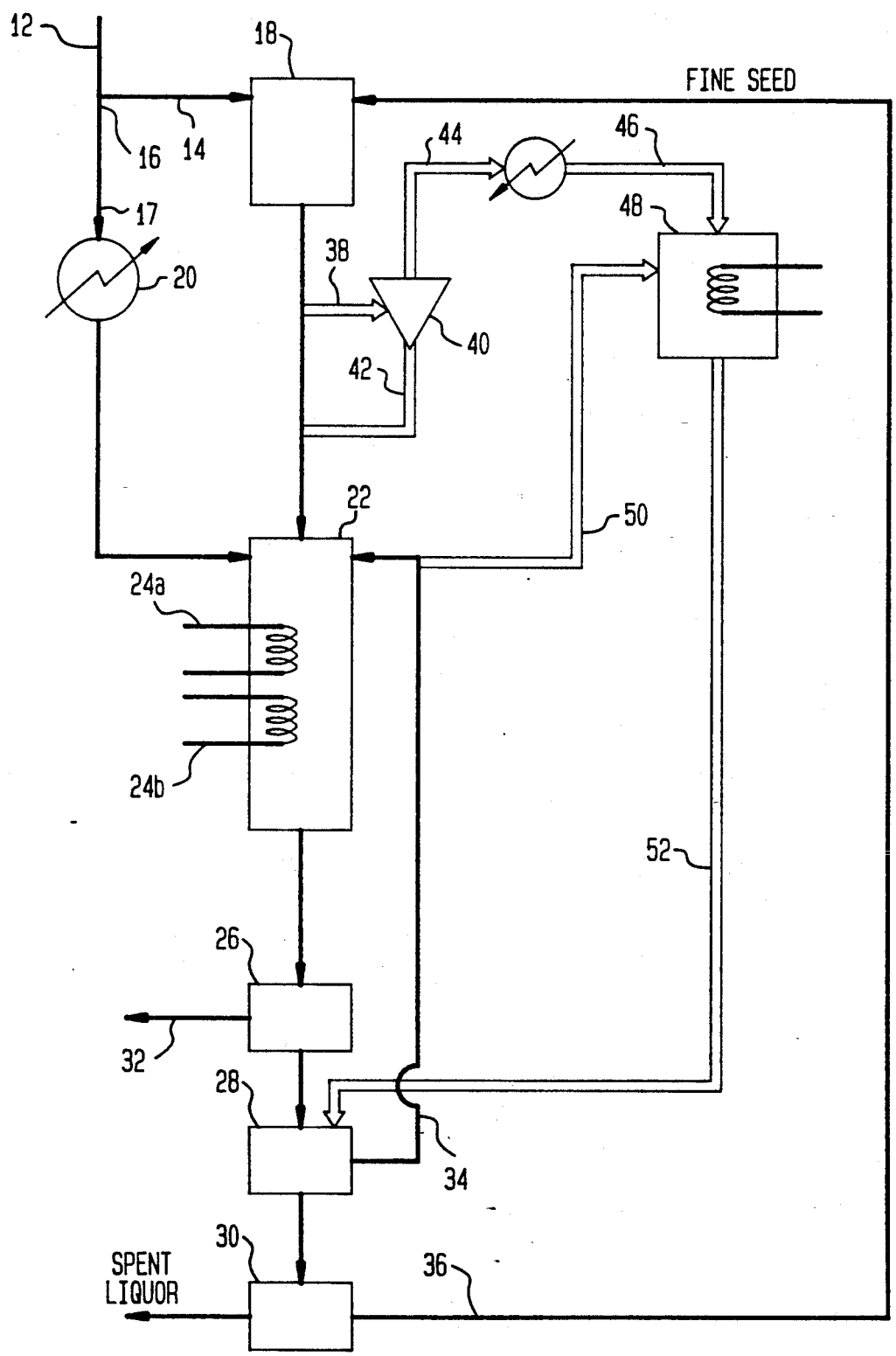
FIG. 1B is a schematic drawing of an illustrative embodiment of the process of the present invention.

FIGS. 1A and 1B illustrates schematically an example of a precipitation circuit for use in the recovery of alumina trihydroxide or alumina hydrate from Bayer process liquors generally including the improvements of the present invention. Referring to FIG. 1A, the incoming Bayer process stream 12 is divided into a minor portion 14 and a major portion 16. The minor portion 14 enters the agglomeration section 18 which comprises a short chain of small tanks to maintain lower or minimal residence time and hence high alumina-caustic ratios. The major portion of the stream 16 follows a pipeline 17 to a cooling unit 20 after which it enters the growth section 22 including a chain of up to 20 precipitation tanks. These tanks (not separately shown) may have a capacity of 4,400 $m^3$ or more, to provide a residence time of about 4 hours. The tanks in the growth section 22 may have in-tank cooling devices 24a,b. The slurry (not shown) exiting the growth section 22 enters a three stage classification process, eventually yielding product 32. A three stage classification should preferably have three distinct classifiers 26, 28, 30 to separate particles of different sizes. Product 32 is collected from the first stage 26. Coarse seed 34 is removed from second classification stage 28 and returned to growth section 22, while fine seed 36 is removed from the third and final classification stage 30 and returned to agglomeration stage 18 at the beginning of the system.

A particularly important aspect of the present invention involves treatment of the slurry leaving the agglomeration stage 18. As shown in FIG. 1B, the slurry (represented by arrows in the schematic flow diagram of FIG. 1) leaving the agglomeration section 18 is directed through a pipeline 38 to a separating device 40 which may be a gravity settler, a filter, or preferably a hydrocyclone. The separating device 40 produces a solids rich stream 42 for transfer to the growth section 22. Preferably, as much of the precipitated solids should be removed from the agglomeration slurry as possible, and an essentially solids free stream 44 is subjected to further processing. This stream 44 is cooled 46 and fed to a nucleation tank or series of tanks 48 where a small amount of coarse seed charge 50 is added to promote nucleation. After about 20 to about 40 hours residence time in the nucleation or tanks 48, the resulting slurry 52 is drawn off and fed to any desired part of the main circuit, but preferably undergoes separation in the secondary classification circuit 28 which separates the coarse particle fraction of the product from the slurry and allows the nucleated fine material to pass to the tertiary stage of classification 30 where it may be returned to the agglomeration stage 18 for further processing.

Preferably, the coarse seed charge 50 ranges from about 5 to about 10 grams/liter. The overflow liquor 44 or solids free stream should preferably be cooled below 50° C., preferably as low as below 45° C. in order to reestablish the supersaturation of alumina in the liquor.

Figure 2:
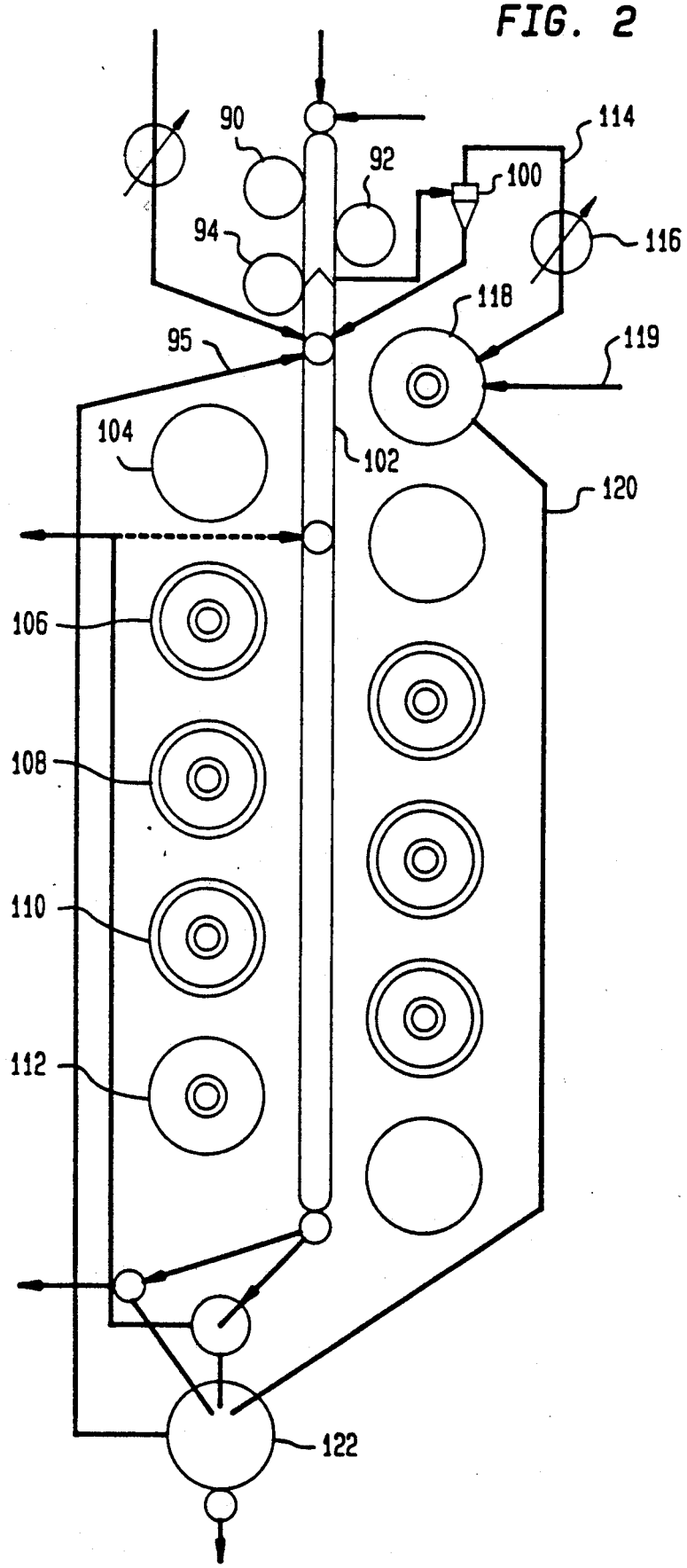
FIG. 2 is a schematic drawing of an embodiment of an improved Bayer process precipitation system for carrying out the process of the present invention.

FIG. 2 illustrates schematically an exemplary flow sheet for a system suitable for carrying out the improved process of the present invention. The product slurry resulting from the precipitation tanks 90, 92, 94 of the agglomeration stage is routed by pipe through hydrocyclones 100 or other suitable separation system such as gravity settlers or a filtration system (not shown). The underflow (thickened) slurry is fed directly to a pipe 102 leading to first intermediate strengthening precipitator 104. Additional pregnant liquor which has been externally cooled to about 70°-73° C. is also fed in at feed mixing point 95. Additionally, seed (not shown) is added or charged to the next tank 106 in the series so as to bring the overall solids concentration at this tank to about 200 to 300 g/l (as hydrate). The precipitation process continues through the remaining tanks 108, 110, 112.

The overflow of partially clarified liquor from the hydrocyclone 100 flows through pipe 114 to cooler 116 where it is cooled to below about 50° C. (preferably as low as about 45° C.) in order to reestablish supersaturation of the sodium aluminate. It is charged to vessel 118, along with a small amount (typically 5-10 gpl) of seed 119 in order to promote nucleation. The overflow liquor remains in this vessel 118 for between 30-40 hours. The fine particles generated in this vessel 118 proceed through pipe 120 to the secondary classifier 122. The solids separated in secondary classifier 122 get used as coarse seed at feed mixing point 95.

It should by now be apparent to those of ordinary skill in the art to which this invention pertains, that important benefits accrue from the improvements provided by the present invention. FIGS. 3 and 4 constitute plots of the $Na_2O$ concentration in the precipitated alumina, and the $Al_2O_3$/caustic (A/C) ratio of liquor in the various tanks or vessels of FIG. 2 in which the process is carried out. These results were calculated using a computerized mathematical model for the Bayer process. The mathematical model was used to compare the improved process of the invention with a process lacking the additional treatment of the agglomeration slurry, for example in accordance with the process as set forth in U.S. application Ser. No. 480,059 now U.S. Pat. No. 5,102,426, and U.S. application Ser. No. 665,340, now U.S. Pat. No. 5,158,577. FIGS. 3 and 4 demonstrate that the improved process of the present invention provides a lower $Na_2O$ level in the fifth and subsequent tanks than was formerly obtainable. The process of the present invention reduces $Na_2O$ level to about 0.1% to about 0.3% or less. Referring to FIGS. 2 and 4, the improved process of the present invention enables much lower A/C ratios than was obtainable with the conventional process. It appears that tank 118 (identified as tank no. 4 in FIG. 4) acts as a fine seed generator due to the low A/C ratio. Thereafter, in the improved process, tank 104 (tank no. 5 in FIG. 4) has only a slightly higher A/C ratio and in the subsequent tanks the A/C ratio is about the same in both the improved and conventional processes. Thus, the modified process maintained high levels of super-saturation, equivalent to those in the earlier disclosed process, but achieves lower $Na_2O$ levels in the product.

Various modifications will be apparent to those of ordinary skill in the art. It is intended that all such modifications and all equivalents be included within the scope of the claims hereinafter set forth.

We claim:

1. In a process for precipitating alumina hydrate from a stream of Bayer process liquor, wherein the stream is first divided into a major portion and a minor portion, the minor portion fed to an agglomeration stage and seeded with fine seed to induce precipitation and formation of a slurry, and the major portion cooled and charged with coarse seed and directed to a growth stage to induce formation of alumina hydrate product; the steps of:

separating solids from the minor portion after formation of the slurry;

cooling, to a temperature of between about 45° C. and about 60° C., the liquid remaining after separating solids from the slurry formed in the agglomeration stage;

adding an amount of coarse seed of about 80 to about 100 microns in median particle size to the remaining liquid to generate a slurry of fresh hydrate nuclei; and recombining the slurry of fresh hydrate nuclei with the major portion of the stream.

2. A process in accordance with claim 1, wherein the slurry of fresh hydrate nuclei are recombined with the major portion of the stream beyond the growth stage.

3. A process in accordance with claim 2, wherein the slurry of fresh hydrate nuclei are recombined with the major portion of the stream in a classification stage.

4. A process in accordance with claim 3, wherein the remaining liquid is cooled to a temperature no greater than about 50° C.

5. A process in accordance with claim 4, wherein the remaining liquid is cooled to a temperature of about 45° C. to about 50° C.

6. A process in accordance with claim 3, wherein the fresh hydrate nuclei are recombined with the major portion of the stream in a secondary classification circuit which removes coarse product particles and passes nucleated fine particles to a tertiary classification stage.

7. A process in accordance with claim 6, wherein the process is run in a continuous mode.

8. A process in accordance with claim 6, wherein the process is run in a batch mode.

9. A process in accordance with claim 4, wherein the remaining liquid has an alumina to caustic ratio of between about 0.4 to about 0.5.

10. A process in accordance with claim 3, wherein the solids are separated from the remaining liquid in a separating device.

11. A process in accordance with claim 10, wherein the separating device is a gravity settler, a filter or a hydrocyclone.

12. A process in accordance with claim 10, wherein the separating device is a hydrocyclone.

13. In a process for precipitating alumina trihydrate from a stream of Bayer process liquor, wherein the stream is first divided into a major portion and a minor portion, the minor portion fed to a series of tanks constituting an agglomeration stage, and the major portion cooled, charged with coarse seed, and directed to a series of tanks constituting a growth stage to induce formation of product;

the steps of:

separating solids from liquid in the slurry formed in the agglomeration stage;

cooling, to a temperature of less than about 50° C., liquid remaining after separating solids from the slurry formed in the agglomeration stage;

adding an amount of coarse seed of about 80 to about 100 microns in median particle size to the remaining liquid to generate a slurry of fresh hydrate nuclei; and recombining the slurry of fresh hydrate nuclei with the major portion of the stream.

14. A process in accordance with claim 13, wherein the remaining liquid is cooled to a temperature of about 45° C. to about 50° C.

15. A process in accordance with claim 14, wherein the slurry of fresh hydrate nuclei are recombined with the major portion of the stream in a classification stage.

* * * * *